United States Patent
Chandrakar et al.

(12)

(10) Patent No.: US 11,983,478 B2
(45) Date of Patent: May 14, 2024

(54) SELECTION OF FULL OR INCREMENTAL IMPLEMENTATION FLOWS IN PROCESSING CIRCUIT DESIGNS

(71) Applicant: Xilinx, Inc., San Jose, CA (US)

(72) Inventors: Shant Chandrakar, Hyderbabad (IN); Sourabh Anand, Hyderbabad (IN); Shubham Rajput, Auraiya (IN); Kameshwar Chandrasekar, Hyderbabad (IN)

(73) Assignee: XILINX, INC., San Jose, CA (US)

( * ) Notice: Subject to any disclaimer, the term of this patent is extended or adjusted under 35 U.S.C. 154(b) by 259 days.

(21) Appl. No.: 17/691,771

(22) Filed: Mar. 10, 2022

(65) Prior Publication Data

US 2023/0289503 A1   Sep. 14, 2023

(51) Int. Cl.
G06F 30/394 (2020.01)
G06F 30/31 (2020.01)
G06F 30/327 (2020.01)
G06F 30/392 (2020.01)

(52) U.S. Cl.
CPC ........... *G06F 30/394* (2020.01); *G06F 30/31* (2020.01); *G06F 30/327* (2020.01); *G06F 30/392* (2020.01)

(58) Field of Classification Search
CPC ..................................................... G06F 30/394
USPC ......................................................... 716/126
See application file for complete search history.

(56) References Cited

U.S. PATENT DOCUMENTS 7,620,927 B1 * 11/2009 Ochotta ................ G06F 30/347
                                                              716/105

OTHER PUBLICATIONS

XLNX, "Vivado Design Suite User Guide Implementation", www.xilinx.com, UG904 (v2020.1) Aug. 25, 2020.

* cited by examiner

*Primary Examiner* — Eric D Lee
(74) *Attorney, Agent, or Firm* — Crawford Maunu PLLC

(57) ABSTRACT

A machine learning-based process includes identifying a first set of features that includes features of a reference implementation of a circuit design and features of a synthesized version of a modified version of the circuit design. A first classification model is applied to the first set of features, and the first classification model indicates a full implementation flow or an incremental implementation flow. The full implementation flow is performed on the synthesized version of the modified version in response to the first classification model indicating the full implementation flow, and the incremental implementation flow is performed on the synthesized version of the modified version in response to the first classification model indicating the incremental implementation flow. The full and incremental implementation flows generate implementation data that is suitable for making an integrated circuit (IC).

20 Claims, 5 Drawing Sheets

SELECTION OF FULL OR INCREMENTAL IMPLEMENTATION FLOWS IN PROCESSING CIRCUIT DESIGNS

TECHNICAL FIELD

The disclosure generally relates to application of machine learning techniques to the selection between a full or an incremental implementation flow in processing a circuit design.

BACKGROUND

Circuit designers often make small modifications to the register transfer language (RTL) specification of a circuit design during the later stages of the design cycle. An incremental implementation flow can be used to integrate the changed portions with unchanged parts of the circuit design in less time than a full implementation flow. A design tool performing an incremental implementation flow uses the previous implementation as a reference and identifies the changed portions. The design tool generates implementation data, which indicates placement and routing of circuit elements, from the changed portions and attempts to integrate the changed implementation data with unchanged portions of the previous implementation. Depending on the size and complexity of the circuit design, an incremental implementation flow can save time and thereby reduce usage of computation resources over a full implementation flow, because a full implementation flow does not reuse any placement and routing information from a previous implementation flow.

Though an incremental implementation flow can save time in some scenarios, in other scenarios attempting an incremental implementation flow can increase the time expended in generating a suitable implementation. Many steps are involved in an incremental implementation flow, such as replaying physical optimizations to replicate the physical optimization modifications found in the reference implementation in the new implementation. Other steps include cell matching and net matching to identify new cells and nets, and replacing and rerouting of existing logic and nets. An objective of the incremental implementation flow is to implement the modifications with minimal perturbations to the unchanged portions of the reference implementation in order to preserve timing performance. However, the particular modifications and the reference implementation can both affect the quality of results that can be achieved by the incremental implementation flow. In some cases, after having performed an incremental implementation flow, the quality of results may be worse than the previous implementation, forcing the designer to perform a full implementation flow on the entire design.

SUMMARY

A disclosed method includes identifying a first set of features that includes features of a reference implementation of a circuit design and features of a synthesized version of a modified version of the circuit design by a design tool executing on a computer. The method includes applying a first classification model to the first set of features by the design tool and indicating by the first classification model one of a full implementation flow or an incremental implementation flow based on the first set of features. The method includes performing the full implementation flow on the synthesized version of the modified version by the design tool in response to the first classification model indicating the full implementation flow, and performing the incremental implementation flow on the synthesized version of the modified version by the design tool in response to the first classification model indicating the incremental implementation flow. The method includes generating by the full implementation flow and the incremental implementation flow, implementation data that is suitable for making an integrated circuit (IC).

A disclosed system includes one or more computer processors configured to execute program code and a memory arrangement coupled to the one or more computer processors. The memory arrangement is configured with instructions of a design tool that when executed by the one or more computer processors cause the one or more computer processors to perform operations including identifying a first set of features that includes features of a reference implementation of a circuit design and features of a synthesized version of a modified version of the circuit design. The operations include applying a first classification model to the first set of features and indicating by the first classification model one of a full implementation flow or an incremental implementation flow based on the first set of features. The operations include performing the full implementation flow on the synthesized version of the modified version in response to the first classification model indicating the full implementation flow and performing the incremental implementation flow on the synthesized version of the modified version in response to the first classification model indicating the incremental implementation flow. The operations include generating by the full implementation flow and the incremental implementation flow, implementation data that is suitable for making an integrated circuit (IC).

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
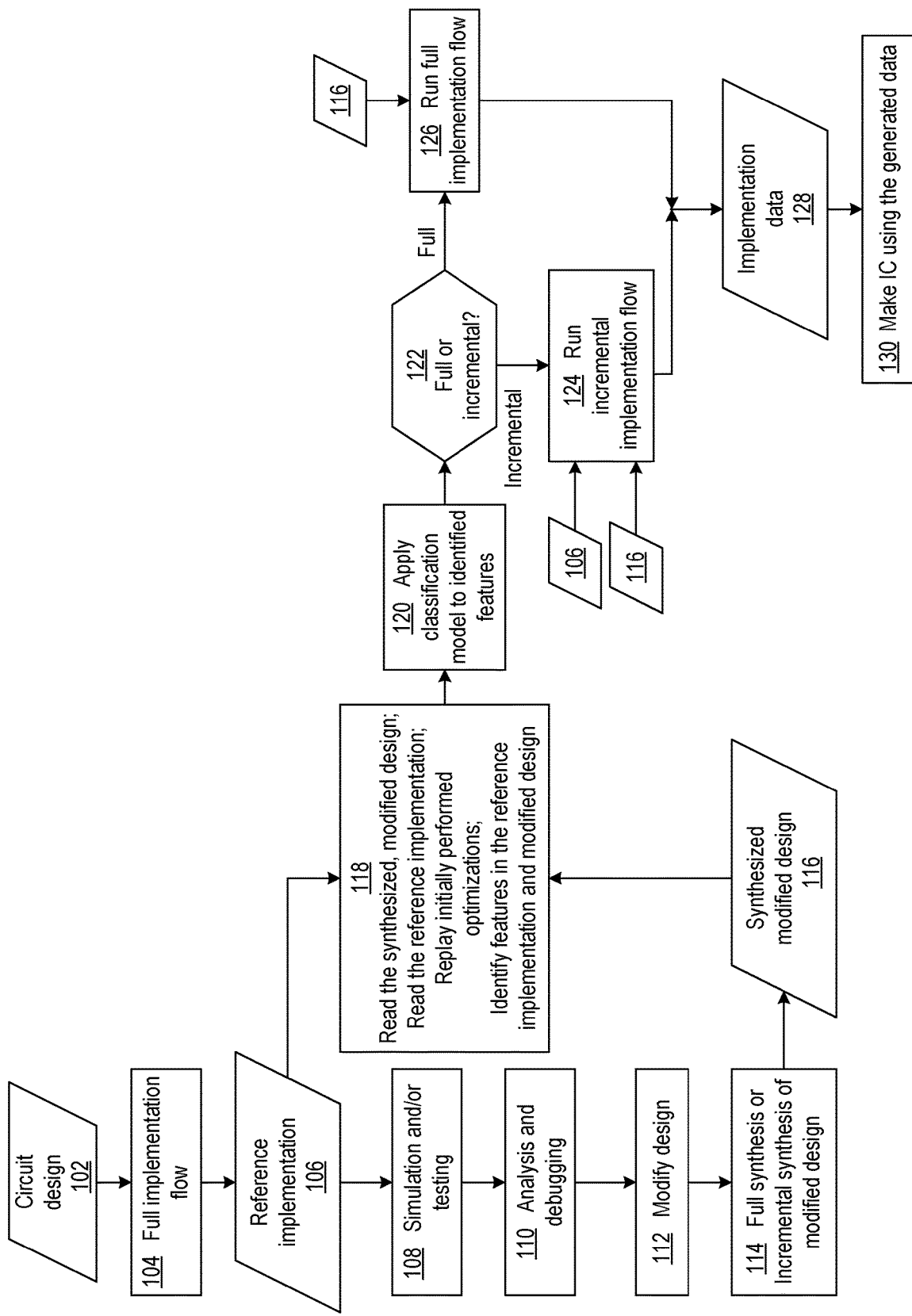
FIG. 1 shows a flowchart of a process in which a circuit design undergoes a full implementation flow, design modification, and classification to select either a full or incremental implementation flow for the modified design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The inventors have recognized that in some scenarios, selecting an incremental implementation flow for a modified circuit design can require a longer runtime, and thereby more computing resources, than if a full implementation flow had instead been selected for processing the modified circuit design. For example, if the modified modules of the circuit design had been placed and routed in a highly utilized region in the initial implementation flow, incremental placement and incremental routing can be much more difficult. Incremental implementation algorithms may iterate many times attempting to find legal placement and routing solutions. In addition, the incremental flow may have a lesser probability of successfully satisfying desired timing performance, even with a longer runtime. In a worst case, after a failed incremental flow a designer would have to run a full implementation flow on the modified design.

According to the disclosed methods and systems, the amount of computer resources consumed in implementing a modified circuit design can be reduced by employing one or more classification models during the implementation flow to select between full and incremental flows based on features of the initial implementation ("reference implementation") modified design.

FIG. 1 shows a flowchart of a process in which a circuit design undergoes a full implementation flow, design modification, and classification to select either a full or incremental implementation flow for the modified design. Blocks 102-114 generally show an initial full implementation flow and design modification, and blocks 116-126 show the classification and selection between full or incremental implementation flows for the modified design. The full and incremental implementation flows can be performed by one or more circuit design tools (collectively, "design tool") that perform netlist optimization, placement, physical synthesis, and routing.

At block 104, the design tool inputs a circuit design 102 and runs a full implementation flow, which produces a reference implementation 106. The reference implementation is fully placed and routed netlist description of the circuit design. The full implementation flow includes synthesis, placement, and routing of the circuit design. A full implementation flow can be distinguished from an incremental implementation flow in that an incremental implementation flow attempts to reuse data generated from a previous implementation flow, for example, placement data and/or routing data, in generating a finally placed and routed design. A full implementation flow does not reuse data generated in a previous implementation flow.

The reference implementation 106 can be used in a simulation and or test environment at block 108 to verify correct operation. At block 110, during simulation and/or testing, the designer can analyze and debug the circuit design to identify the causes of any discovered deficiencies. At block 112, the designer can modify the circuit design 102 to correct the discovered design flaws. The designer can direct the design tool to perform full or incremental synthesis of the modified circuit design at block 114, both of which would generate the synthesized modified design 116.

At block 118, the design tool assembles data needed to determine whether to perform a full or incremental implementation flow and the data needed for the selected implementation flow. The design tool reads the synthesized modified design 116 and the reference implementation. The design tool replays optimizations, which were initially performed and recorded for subsequent reference in generating the reference implementation, on the synthesized modified design.

Also at block 118, the design tool identifies features of the reference implementation and the synthesized modified design 116 relevant to the classification model used to select between a full or incremental implementation flow. The relevant features of the reference implementation can generally include timing results and routing resource utilization. The timing results can include the Worst Negative Slack (WNS) and the Worst Hold Slack (WHS) of the reference implementation. The slack values can be determined through static analysis of the reference implementation by the design tool.

The type of routing resources indicated by the level of utilization of routing resources of the reference implementation can depend on the type of device to which the circuit design is targeted for implementation. For example, for circuit designs targeted to various field programmable gate array (FPGA) devices from Xilinx, Inc., the level of utilization of routing resources can be the utilization of different node multiplexers in the interconnect tiles of the device. The node multiplexers can include those identified as Node_Inode, Node_pinbounce, Node_Lutinput, Node_output, Node_clk_ctrl_pinfeed, Node_vdouble, Node_hdouble, Node_vsingle, Node_hsingle, Node_lagunainfeed, and Node_lagunalocal.

The level of utilization of routing resources of the reference implementation can also include a maximum effective congestion level, a total Manhattan wirelength, and a level of demand for global routing resources (e.g., the number of unique control sets and the number of global clock buffers).

The relevant features of the synthesized modified design can generally include the number of physical optimizations replayed on the synthesized modified design 116 (or "netlist"), a level of utilization of device resources, the level of netlist matching, the level of solution reuse, and the WNS of the synthesized modified design. Examples of replayed physical optimizations include fanout replication, register duplication, and buffer insertion.

The type of resources indicated by the level of utilization of device resources can depend on the type of device to which the circuit design is targeted for implementation. For example, for circuit designs targeted to various FPGA devices from Xilinx, Inc., the level of utilization of device resources can be a percentage utilization of BRAMs, DSPs, LUTs, and Flops.

The level of netlist matching can be quantified as percentages of the instances and nets in the synthesized modified design that match instances and nets in the reference implementation. Examples of instances include target device components such as look-up tables, flip-flops, BRAMS, DSPs, etc. The level of instance matching can be:

(number of matched instances)/(total number of instances)*100

Similarly, the level of net matching can be:

(number of matched nets)/(total number of nets)*100

The level of solution reuse can be quantified as percentages of the instances whose placement and nets whose routing in the reference implementation can be reused in the synthesized modified design. The design tool can determine that the placement of an instance in the reference implementation can be reused if the changes in the synthesized modified design do not involve the instance. For example, an instance is not affected by changes in the modified design if the modified portion of the design is not connected to or placed in proximity to that instance, or that instance would not have to be unplaced to improve the quality of results. The level of instance reuse can be:

(number of reused instances)/(total instances)*100

The design tool can determine that the routing of a net in the reference implementation can be reused if the changes in the synthesized modified design do not involve the net. For example, a net can be reused if the net is not connected to or in proximity to the modified portion of the design, or that net would not have to be rerouted to improve the quality of results. The level of routing reuse can be:

(number of reused nets)/(total nets)*100

At block 120, the design tool applies a classification model to the set of identified features. The classification model can be implemented as a random forest model, a decision tree, a boosted tree, warm-start classification method, support vector machine, or convolutional neural network.

Based on the indication provided by the classification model, at decision block 122 the design tool selects either an incremental or a full implementation flow. In response to the classification model indicating an incremental implementation flow, at block 124 the design tool runs an incremental implementation flow using previously placed instances and routed nets from the reference implementation 106 and new/modified instances from the synthesized modified design 116. Otherwise, in response to the classification model indicating a full implementation flow, at block 126 the design tool runs a full implementation flow on the synthesized modified design 116. The full implementation flow does not reuse any of the placement and routing information from the reference implementation 106.

Both the incremental implementation flow and the full implementation flow can generate implementation data 128, which can be used to make or configure an integrated circuit (IC) that implements the circuit design at block 130. For example, bitstream generation tools may be executed to generate configuration data for an FPGA, or other tools can generate configuration data from which an application-specific (ASIC) can be fabricated.

Figure 2:
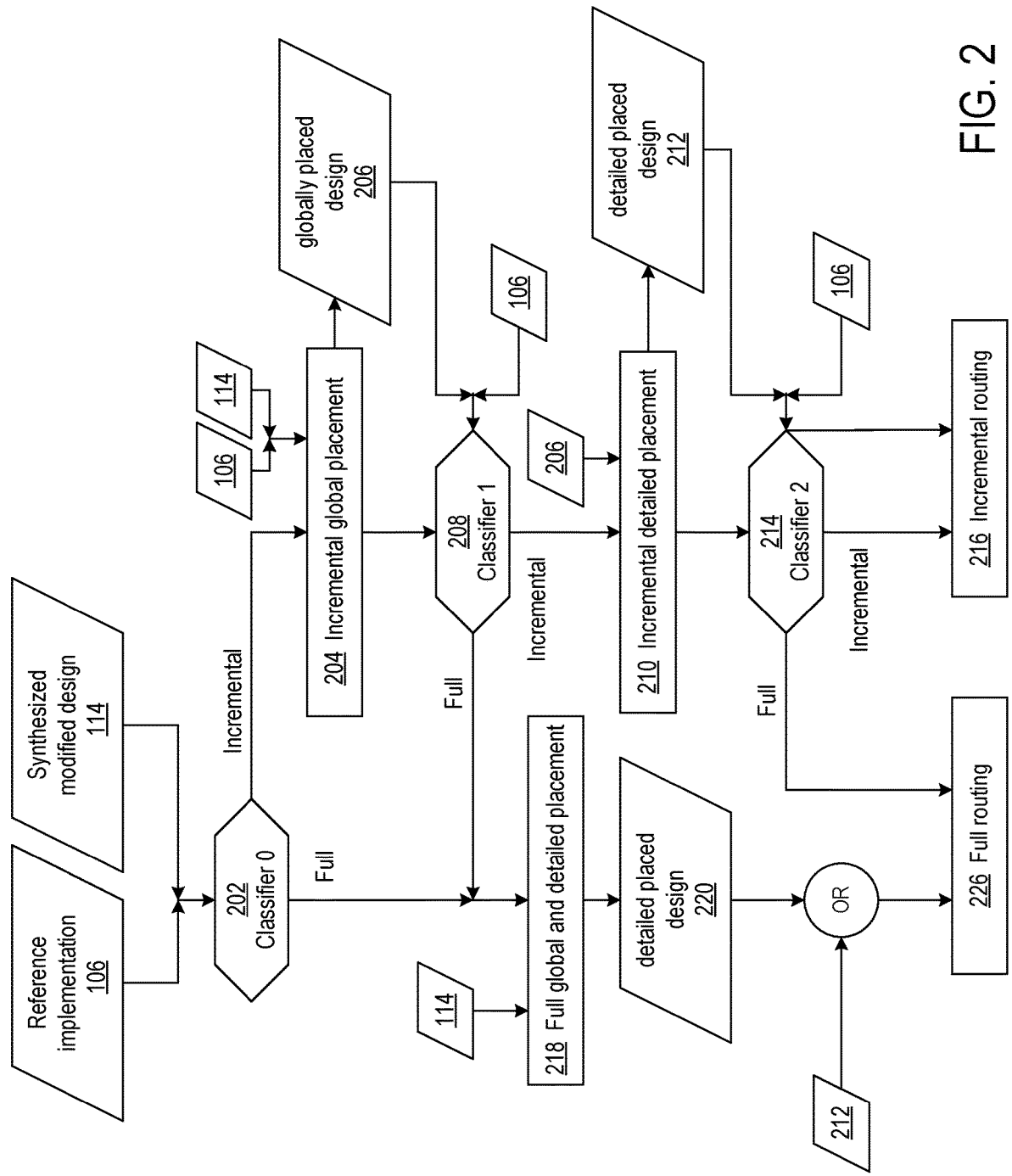
FIG. 2 shows a flowchart of a process in which different classification models are applied at different stages of the implementation flow on a modified circuit design to select between full or incremental placement and between full or incremental routing flows.

FIG. 2 shows a flowchart of a process in which different classification models are applied at different stages of the implementation flow on a modified circuit design to select between full or incremental placement and between full or incremental routing flows. The exemplary process involves three classification models, shown as Classifier 0, Classifier 1, and Classifier 2 in decision blocks 202, 208, and 214, respectively. Classifier 0 is employed early in the process and directs whether the process should attempt any incremental processing at all based on features extracted from the reference implementation 106 and the synthesized modified design 116. The features input to Classifier 0 can be the same features input to the classification model in the process of FIG. 1.

In response to Classifier 0 indicating an incremental implementation flow, at block 204 the design tool reuses the placement information of those instances in the reference implementation 106 not affected by design changes in the synthesized modified design 114 and determines new global placements for new instances or instances affected by the changes to generate the globally placed design 206.

Once the globally placed design 206 has been generated, the design tool can invoke Classifier 1. Classifier 1 inputs the reference implementation 106 and globally placed design 206 and extracts features for applying its classification model. The features extracted from the reference implementation are those described above. In addition, Classifier 1 can input the additional feature of the number of timing paths in the reference implementation having negative slack. The features of the globally placed design 206 input to Classifier 1 can include the WNS, the WHS, and/or the number of timing paths having negative slack.

Notably, the features input to the classification models of Classifiers 0, 1, and 2 are additive, as more features become available after each stage of processing. The accuracy of the classifiers improves the design tool proceeds through the implementation flow.

Classifier 1 controls whether to perform an incremental detailed placement at block 210 or to abort the incremental flow and perform a full global and detailed placement, which uses only the instance information from the synthesized modified design 114 and does not use placement information from the reference implementation, to generate detailed placed design 220 at block 218.

In response to Classifier 1 determining that the features of the reference implementation 106 and the features of the globally placed design 206 suggest continuing with the incremental flow, the design tool runs incremental detailed placement at block 210. The incremental detailed placement generates detailed placed design 212 based on the information of the globally placed design 206. The incremental global placement can reuse detailed placements of instances from the reference implementation so that the incremental detailed placement process does not have to find placements for those instances. However, the incremental global placer can unplace selected instances to improve the quality of results. Then, the global placement assigns initial placements, and the incremental detailed placement finds legal, empty places in the reference implementation or moves existing logic of the reference implementation.

Once the detailed placed design 212 has been generated, the design tool can invoke Classifier 2. Classifier 2 inputs and extracts features of the reference implementation and features of the detailed placed design.

The features extracted from the reference implementation are those described above. The features of the detailed placed design 212 input to Classifier 2 can include the WNS and the WHS, the total Manhattan wirelength, the percentage of instances having the same placement in the detailed placed design 212 as in the reference implementation 106, and the average of differences between the placement locations of all instances in the detailed placed design 212 and matching instances in the reference implementation 106.

In response to Classifier 2 determining that the features of the reference implementation 106 and the features of the detailed placed design 212 suggest continuing with the incremental flow, the design tool runs incremental routing at block 216. The incremental routing uses previously generated routing information from the reference implementation 106 and the detailed placed design 212 to generate a completely routed design.

In response to Classifier 2 determining that the features of the reference implementation 106 and the features of the detailed placed design 212 suggest a full routing flow, the design tool runs a full routing process at block 226. If activated in response to Classifier 2, the full routing process uses the detailed placed design 212 information (and not routing information from the reference implementation) to generate a complete routed design. Otherwise, if the full routing process is activated in response to determinations made by Classifier 0 or Classifier 1, the full routing process inputs the detailed placed design 220, which was generated by a full global and detailed placement block 218.

Figure 3:
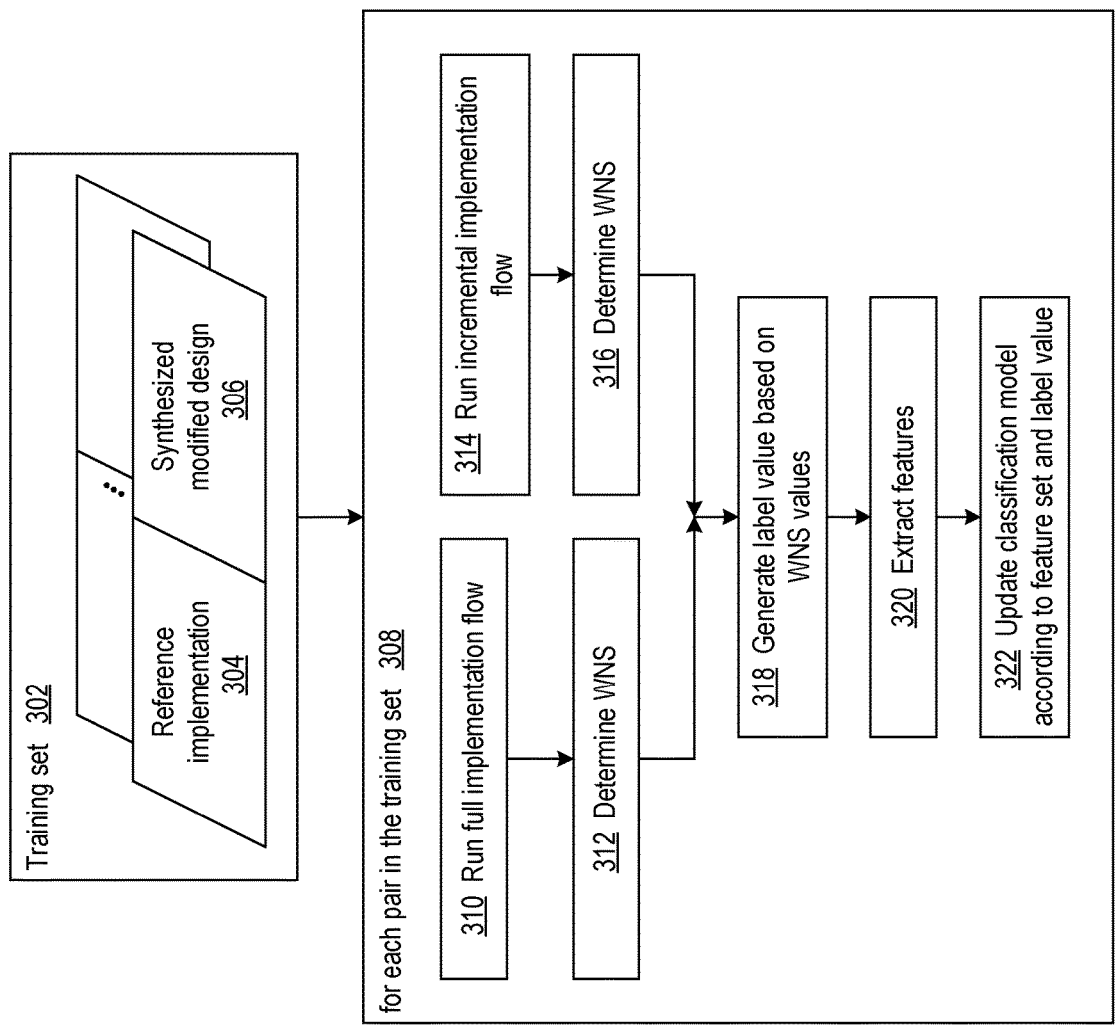
FIG. 3 shows a flowchart of a process of training a classification model to select between full and partial implementation flows.

FIG. 3 shows a flowchart of a process of training a classification model to select between full and partial implementation flows. The training set includes pairs of reference implementations 304 and synthesized modified designs 306. The process of block 308 is performed on each pair in the training set.

At block 310, a full implementation flow is performed on the synthesized modified design, and at block 314 an incremental implementation flow is run on the synthesized modified design. Each of the full implementation flow and the incremental implementation flow generates a fully routed implementation, which can be referred to as a "full-flow implementation" and an "incremental-flow implementation."

According to one approach, the WNS of the full-flow implementation ("full_flow_WNS") and the WNS of the incremental-flow implementation ("incremental_flow_WNS") are used to generate a label value. At block 312, the training process determines the full_flow_WNS, and a block 316, the training process determines the incremental_flow_WNS.

At block 318, the training process generates a label value based on the full-flow WNS and the implementation-flow WNS. According to an exemplary approach, the label value can be computed as:

Label=min(0,incremental_flow_WNS)−min(0,full_flow_WNS)>=0?Positive:Negative;

The comparison using the "min" function considers only negative WNS values. The "Positive" label value indicates that the implementation resulting from the incremental implementation flow resulted in a better solution in terms of slack than did the full-flow implementation. The "Negative" label value indicates the full-flow implementation has the better solution. A test case is labeled as Positive if both the incremental_flow_WNS and the full_flow_WNS are positive.

At block 320, the training process extracts the features of the reference implementation and the synthesized modified design. The training process updates the classification model according to the feature set and associated label value at block 322.

It will be recognized that the classification models used by Classifiers 1 and 2 in the process of FIG. 2 can be similarly trained. The training sets would differ from the training set 302 in that the synthesized modified designs paired with the reference implementations would instead bet the inputs to the classifiers, and the label generation would be based on WNS of the full-flow result as compared to the WNS of the incremental-flow result.

Figure 4:
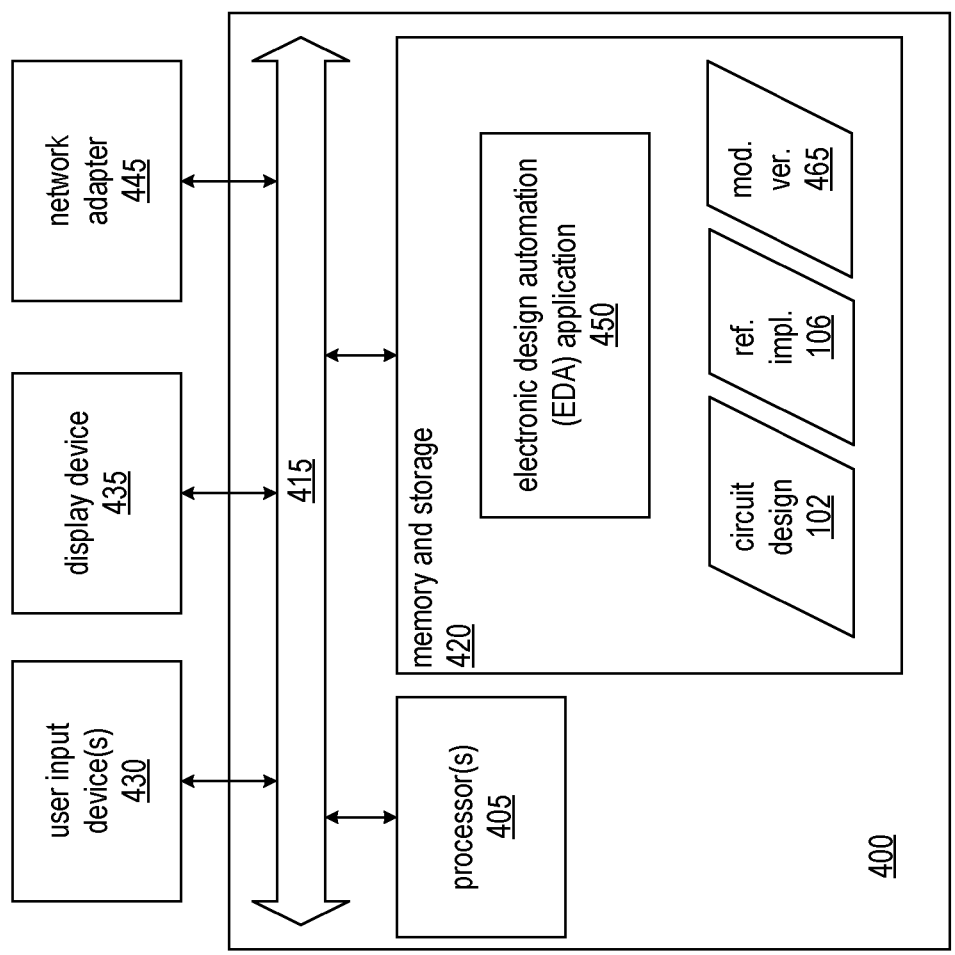
FIG. 4 is a block diagram illustrating an exemplary data processing system.

FIG. 4 is a block diagram illustrating an exemplary data processing system (or "system") 400. System 400 is an example of an EDA system. As pictured, system 400 includes at least one processor circuit (or "processor") 405, e.g., a central processing unit (CPU) coupled to memory and storage arrangement 420 through a system bus 415 or other suitable circuitry. System 400 stores program code and circuit design 102 within memory and storage arrangement 420. Processor 405 executes the program code accessed from the memory and storage arrangement 420 via system bus 415. In one aspect, system 400 is implemented as a computer or other data processing system that is suitable for storing and/or executing program code. It should be appreciated, however, that system 400 can be implemented in the form of any system including a processor and memory that is capable of performing the functions described within this disclosure.

Memory and storage arrangement 420 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 400 may also include one or more cache memories (not shown) that provide temporary storage of at least some program code and data in order to reduce the number of times program code and data must be retrieved from local memory and persistent storage during execution.

Input/output (I/O) devices such as user input device(s) 430 and a display device 435 may be optionally coupled to system 400. The I/O devices may be coupled to system 400 either directly or through intervening I/O controllers. A network adapter 445 also can be coupled to system 400 in order to couple system 400 to other systems, computer systems, remote printers, and/or remote storage devices through intervening private or public networks. Modems, cable modems, Ethernet cards, and wireless transceivers are examples of different types of network adapter 445 that can be used with system 400.

Memory and storage arrangement 420 may store an EDA application 450. EDA application 450, being implemented in the form of executable program code, is executed by processor(s) 405. As such, EDA application 450 is considered part of system 400, and system 400 is specifically configured to perform the training process and/or the implementation flows described above. System 400, while specifically configured to execute EDA application 450, receives and operates on circuit design 102.

In one aspect, system 400 can construct and train a classification model(s) according to the training process described above. In another aspect, the EDA application can include a design tool that uses one or more classification models to select between full and incremental implementation flows. In selecting between a full and incremental implementation flow in processing a modified version of circuit design 102, the design tool uses features of reference implementation 106 and a modified version 465, which can be a synthesized modified design (FIG. 1, 116), an incremental-flow globally placed design (FIG. 2, 206), or an incremental-flow detailed placed design (FIG. 2, 212) as described above. System 400 generates data suitable for making an IC.

EDA application 450, circuit design 102, modified version 465, and any data items used, generated, and/or operated upon by EDA application 450 are functional data structures that impart functionality when employed as part of system 400 or when such elements, including derivations and/or modifications thereof, are loaded into an IC such as a programmable IC causing implementation and/or configuration of a circuit design within the programmable IC.

Figure 5:
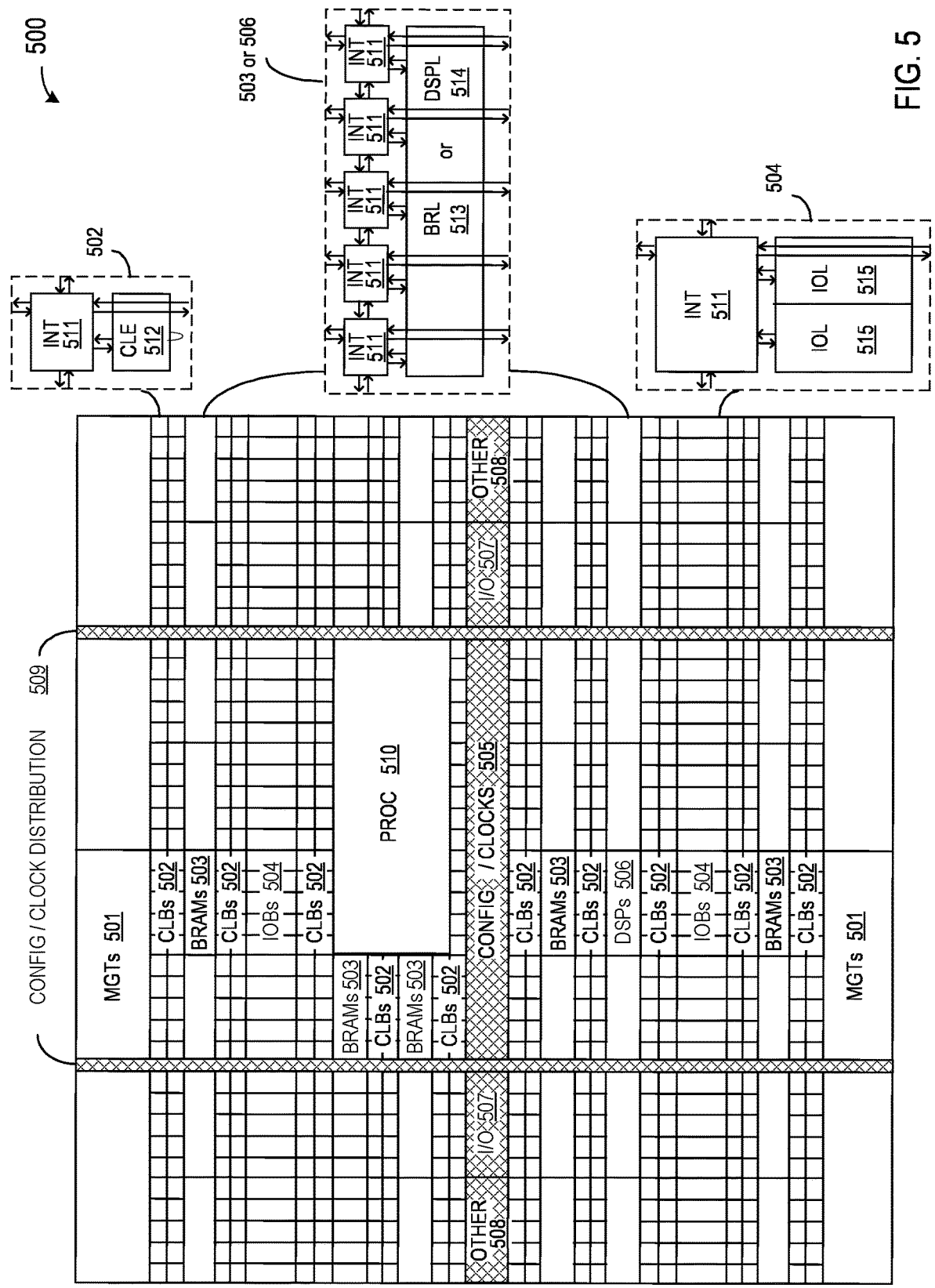
FIG. 5 shows a programmable integrated circuit (IC) on which circuit designs processed according to the disclosed methods and systems may be implemented.

Some implementations are directed to a computer program product (e.g., nonvolatile memory device), which includes a machine or computer-readable medium having stored thereon instructions which may be executed by a computer (or other electronic device) to perform these operations/activities FIG. 5 shows a programmable integrated circuit (IC) 500 on which circuit designs processed according to the disclosed methods and systems may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 506 can include a DSP logic element (DSPL) 514 in addition to an appropriate number of programmable interconnect elements. An 10B 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

A columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of approaches for improving circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
    identifying a first set of features that includes features of a reference implementation of a circuit design and features of a synthesized version of a modified version of the circuit design by a design tool executing on a computer;
    applying a first classification model to the first set of features by the design tool;
    indicating by the first classification model one of a full implementation flow or an incremental implementation flow based on the first set of features;
    performing the full implementation flow on the synthesized version of the modified version by the design tool in response to the first classification model indicating the full implementation flow;
    performing the incremental implementation flow on the synthesized version of the modified version by the design tool in response to the first classification model indicating the incremental implementation flow; and
    generating by the full implementation flow and the incremental implementation flow, implementation data that is suitable for making an integrated circuit (IC).

2. The method of claim 1, wherein performing the incremental implementation flow includes:
    applying a second model that selects between performing an incremental detailed placement or a full global and detailed placement; and
    applying a third classification model that selects between performing an incremental routing or a full routing.

3. The method of claim 1, wherein the first set of features includes a worst negative slack (WNS) of the reference implementation, a WNS of the synthesized version of the modified version, and a level of utilization of routing resources of the reference implementation.

4. The method of claim 3, wherein the first set of features includes a worst hold slack of the reference implementation, a level of demand for global routing resources of the reference implementation, and a level of matching between instances in the reference implementation and instances in the synthesized version of the modified version.

5. The method of claim 3, wherein the first set of features includes a level of utilization of device resources of the synthesized version of the modified version.

6. The method of claim 3, wherein the first set of features includes a level of matching between instances of the reference implementation and instances of the synthesized version of the modified version.

7. The method of claim 3, wherein the first set of features includes a number of physical optimizations replayed on the synthesized version of the modified version, a level of placement reuse based on placements of logic instances of the reference implementation not affected by modifications in the synthesized version of the modified version, and a level of routing reuse based on routed nets of the reference implementation not affected by modifications in the synthesized version of the modified version.

8. The method of claim 1, wherein:
the performing the incremental implementation flow includes:
performing incremental global placement that generates a globally placed version from the synthesized version of the modified version,
identifying a second set of features that includes features of the reference implementation and features of the globally placed version,
applying a second classification model to the second set of features,
indicating by the second classification model one of a full placement or an incremental detailed placement based on the second set of features, and
performing the incremental detailed placement that generates a first detailed-placed version from the globally placed version in response to the second classification model indicating the incremental detailed placement; and
the performing the full implementation flow includes performing full global placement and detailed placement on the synthesized version of the modified version to generate a second detailed-placed version, in response to the second classification model indicating of a full placement flow.

9. The method of claim 8, wherein:
the performing the incremental implementation flow includes:
identifying a third set of features that includes features of the reference implementation and features of the first detailed-placed version,
applying a third classification model to the third set of features,
indicating by the third classification model one of a full routing or an incremental routing based on the third set of features, and
performing the incremental routing on the first detailed-placed version in response to the third classification model indicating the incremental routing; and
performing a full routing on the second detailed-placed version in response to the third classification model indicating of a full placement flow.

10. The method of claim 1, further comprising making an IC from the implementation data.

11. A system comprising:
one or more computer processors configured to execute program code; and
a memory arrangement coupled to the one or more computer processors, wherein the memory arrangement is configured with instructions of a design tool that when executed by the one or more computer processors cause the one or more computer processors to perform operations including:
identifying a first set of features that includes features of a reference implementation of a circuit design and features of a synthesized version of a modified version of the circuit design;
applying a first classification model to the first set of features;
indicating by the first classification model one of a full implementation flow or an incremental implementation flow based on the first set of features;
performing the full implementation flow on the synthesized version of the modified version in response to the first classification model indicating the full implementation flow;
performing the incremental implementation flow on the synthesized version of the modified version in response to the first classification model indicating the incremental implementation flow; and
generating by the full implementation flow and the incremental implementation flow, implementation data that is suitable for making an integrated circuit (IC).

12. The system of claim 11, wherein the instructions for performing the incremental implementation flow include instructions that cause the one or more computer processors to perform operations including:
applying a second model that selects between performing an incremental detailed placement or a full global and detailed placement; and
applying a third classification model that selects between performing an incremental routing or a full routing.

13. The system of claim 11, wherein the first set of features includes a worst negative slack (WNS) of the reference implementation, a WNS of the synthesized version of the modified version, and a level of utilization of routing resources of the reference implementation.

14. The system of claim 13, wherein the first set of features includes a worst hold slack of the reference implementation, a level of demand for global routing resources of the reference implementation, and a level of matching between instances in the reference implementation and instances in the synthesized version of the modified version.

15. The system of claim 13, wherein the first set of features includes a level of utilization of device resources of the synthesized version of the modified version.

16. The system of claim 13, wherein the first set of features includes a level of matching between instances of the reference implementation and instances of the synthesized version of the modified version.

17. The system of claim 13, wherein the first set of features includes a number of physical optimizations replayed on the synthesized version of the modified version, a level of placement reuse based on placements of logic instances of the reference implementation not affected by modifications in the synthesized version of the modified version, and a level of routing reuse based on routed nets of the reference implementation not affected by modifications in the synthesized version of the modified version.

18. The system of claim 11, wherein:
the instructions for performing the incremental implementation flow include instructions that cause the one or more computer processors to perform operations including:
  performing incremental global placement that generates a globally placed version from the synthesized version of the modified version,
  identifying a second set of features that includes features of the reference implementation and features of the globally placed version,
  applying a second classification model to the second set of features,
  indicating by the second classification model one of a full placement or an incremental detailed placement based on the second set of features, and
  performing the incremental detailed placement that generates a first detailed-placed version from the globally placed version in response to the second classification model indicating the incremental detailed placement; and
the instructions for performing the full implementation flow include instructions that cause the one or more processors to perform full global placement and detailed placement on the synthesized version of the modified version to generate a second detailed-placed version, in response to the second classification model indicating of a full placement flow.

19. The system of claim 18, wherein:
the instructions for performing the incremental implementation flow include instructions that cause the one or more computer processors to perform operations including:
  identifying a third set of features that includes features of the reference implementation and features of the first detailed-placed version,
  applying a third classification model to the third set of features,
  indicating by the third classification model one of a full routing or an incremental routing based on the third set of features, and
  performing the incremental routing on the first detailed-placed version in response to the third classification model indicating the incremental routing; and
the memory arrangement is further configured with instructions cause the one or more computer processors to perform a full routing on the second detailed-placed version in response to the third classification model indicating of a full placement flow.

20. The system of claim 11, wherein the memory arrangement is further configured with instructions cause the one or more computer processors to configure a programmable IC with the implementation data.

* * * * *